US011600109B2

(12) United States Patent
Katz

(10) Patent No.: US 11,600,109 B2
(45) Date of Patent: Mar. 7, 2023

(54) SMART EYEGLASSES FOR SPECIAL NEEDS CHILDREN AND ADULTS

(71) Applicant: Barry Katz, Flushing, NY (US)

(72) Inventor: Barry Katz, Flushing, NY (US)

( * ) Notice: Subject to any disclaimer, the term of this patent is extended or adjusted under 35 U.S.C. 154(b) by 126 days.

(21) Appl. No.: 17/012,047

(22) Filed: Sep. 4, 2020

(65) Prior Publication Data

US 2021/0011547 A1    Jan. 14, 2021

Related U.S. Application Data

(63) Continuation-in-part of application No. 16/876,680, filed on May 18, 2020.

(60) Provisional application No. 62/850,379, filed on May 20, 2019.

(51) Int. Cl.
| | |
|---|---|
| *G06F 3/14* | (2006.01) |
| *G06F 3/16* | (2006.01) |
| *G09B 21/00* | (2006.01) |
| *G02C 11/00* | (2006.01) |
| *G02B 27/00* | (2006.01) |
| *G06V 40/16* | (2022.01) |
| *G09B 19/00* | (2006.01) |
| *G06F 3/01* | (2006.01) |

(52) U.S. Cl.
CPC ....... *G06V 40/166* (2022.01); *G02B 27/0093* (2013.01); *G02C 11/10* (2013.01); *G06F 3/14* (2013.01); *G06F 3/165* (2013.01); *G09B 19/00* (2013.01); *G09B 21/006* (2013.01); *G09B 21/008* (2013.01); *G06F 3/012* (2013.01)

(58) Field of Classification Search
CPC ............ G02B 27/0093; G02B 27/0101; G02B 2027/012; G02B 2027/0138; G02B 2027/014; G02B 2027/0178; A61B 5/12; A61B 5/6803; A61B 2562/0257
See application file for complete search history.

(56) References Cited

U.S. PATENT DOCUMENTS

| | | |
|---|---|---|
| 8,182,267 B2 | 5/2012 | Katz et al. |
| 9,318,029 B2 | 4/2016 | Katz et al. |
| 9,329,689 B2 | 5/2016 | Osterhout et al. |
| 9,864,430 B2 | 1/2018 | Wu et al. |
| 9,980,054 B2 * | 5/2018 | McCracken ............. G02C 7/02 |
| 10,506,924 B2 | 12/2019 | Thompson et al. |
| 11,385,481 B1 * | 7/2022 | Pattikonda ............... G02C 5/12 |
| 2007/0273611 A1 * | 11/2007 | Torch ...................... G06F 3/013 345/8 |

(Continued)

*Primary Examiner* — Daniell L Negron
(74) *Attorney, Agent, or Firm* — Ostrolenk Faber LLP

(57) ABSTRACT

A system that detects whether a user interacting with a featured activity is wearing glasses is described. The system verifies that the user is wearing the glasses and the system prompts the user and a caregiver and may blur, stop or otherwise interrupt a user experience of a featured activity, such as a video game or film, when the system determined that the user is not wearing the glasses. A glasses module may be positioned at frame of the glasses at a head of the user to detect that the user is wearing the glasses. Optical facial processing may detect a face and glasses on the face. Also disclosed is a hearing aid that may be integrated with such a system. A glasses module that aids in depth perception by reporting distance ahead, and a system that trains eye contact with another person wearing glasses are also disclosed.

3 Claims, 15 Drawing Sheets

(56) References Cited

U.S. PATENT DOCUMENTS

| | | | |
|---|---|---|---|
| 2012/0081525 A1* | 4/2012 | Akashi | H04N 13/366 |
| | | | 348/51 |
| 2017/0046025 A1* | 2/2017 | Dascola | G06F 3/04845 |
| 2018/0143458 A1* | 5/2018 | Blum | H04N 5/2251 |
| 2020/0129124 A1* | 4/2020 | Harvey | G02C 11/10 |
| 2020/0159011 A1* | 5/2020 | Rakshit | G06F 3/013 |

* cited by examiner

SMART EYEGLASSES FOR SPECIAL NEEDS CHILDREN AND ADULTS

CROSS-REFERENCE TO RELATED APPLICATION

The present patent application is a continuation-in-part of prior U.S. patent application Ser. No. 16/876,680, filed May 18, 2020, by Barry Katz, and entitled SMART EYEGLASSES FOR SPECIAL NEEDS CHILDREN AND ADULTS, which claims the benefit of and priority to U.S. Provisional Patent Application No. 62/850,379, filed May 20, 2019. The entire contents of each of these patent applications are incorporated herein by reference.

FIELD OF THE INVENTION

The preset invention relates to the field of aiding people in remembering to wear glasses and hearing aids, and in helping special needs or mentally impaired individuals and their caregivers to use technology appropriately, and to a system, device and method for monitoring and training eye contact and communication skills of such individuals.

BACKGROUND OF THE INVENTION

Autistic individuals or special needs persons sometimes have difficulty learning to wear glasses or hearing aids, and learning to use technology, such as video devices, appropriately, and may have difficulty communicating with people, including with caregivers.

Refractive errors are found in children and adults diagnosed as being on the Autism Spectrum Disorder (ASD) at a higher rate of incidence than they are found in the general population. The most common refractive errors are near sightedness, farsightedness, astigmatism, and presbyopia. Uncorrected refractive errors are a main cause of visual impairment. Eyeglasses are often prescribed to correct refractive errors.

Eyeglasses are generally used to improve an individual's acuity and perception of visual stimuli but sometimes people need time to remember to wear glasses, particularly when glasses are prescribed for some tasks, such as reading or interacting with a screen of an electronic device.

However, there are significant difficulties in getting children with autism and other special needs individuals to wear eyeglasses. Some published studies have attempted to explore the problem of training special needs children to wear eyeglasses. These studies focus on manual processes that use a combination of reinforcement techniques, including: non-contingent reinforcement, response blocking, and response cost to increase the wearing of eyeglasses. Non-contingent reinforcement is the use of positive reinforcement that is not related to the occurrence of a target behavior and is used commonly as a method for reinforcing attention in children that seek attention inappropriately. Response blocking and response cost are techniques that involve physically preventing a behavior or the loss of a privilege or item, respectively.

Behavioral studies have met with limited success using manual processes. They involve a small number of children and young adults confined to an institutional setting, such as a hospital or residential facility that provides a controlled environment for those with severe behavioral and intellectual disabilities. Thus, the results may not be readily translatable to training children with autism spectrum disorder or other disabilities to wear their eyeglasses in outpatient settings or local optometry clinics. In addition, qualitative methods of evaluation, i.e. InterObserver Agreement, where humans are used as a part of their measurement procedure, hence the data are primarily subjective, limited data interpretation. Thus, getting special needs children to wear corrective eyewear remains a significant issue for parents, caregivers, and a major clinical unmet need in the fields of optometry and ophthalmology.

Three stages in the use of eyeglasses include detecting, training, and supporting in the natural environment. Intervention at early stages of a child's development may be important to ascertaining whether the child is on the autism spectrum. Once autism is detected, training and education may entail interaction between the child with either play objects and devices like tablets and PCs or other individuals. Once special needs children and adults are taught to put on eyeglasses in an outpatient clinic, the next phase requires the maintenance of eyeglasses in the natural environment, home, school and the community.

Local schools and communities spend valuable resources on repetitive and low level educational goals. Trained professionals may burn out quickly when more time is spent on administrative chores than on training and advancing the skills of the professionals in their field.

The instant disclosure builds upon the present inventor's prior disclosure in his granted U.S. Pat. Nos. 9,318,029 and 8,182,267, the entire contents of which are incorporated by reference herein. Additional background includes: U.S. Pat. Nos. 10,506,924, 9,864,430, 9,329,689. The contents of each of these patent documents are incorporated in full by reference herein.

SUMMARY OF THE DISCLOSURE

Described herein are a device, a system, means for implementing the system, and a method for determining that a user is wearing glasses and for encouraging the wearing of the glasses. A system for detecting that a user interacting with a featured activity is wearing glasses includes: a glasses position verifier that verifies that the user is wearing the glasses and to provide a signal accordingly to a featured activity controller; and the featured activity controller that interferes with an experience of the featured activity when the signal indicates that the user is not wearing the glasses.

Such a system may also include: a glasses module that is positioned at a head of the user and that detect that the user is wearing the glasses, the glasses module transmitting the signal to the glasses position verifier, the signal transmitted according to the detecting.

In such a system, the glasses module may include a head detector that detects a proximity of a head of the user to a frame of the glasses and the glasses module is configured to generate the signal accordingly.

Such a system may also include: a head detector that detects a proximity of a head of the user to a frame of the glasses and that generates the signal accordingly, the head detector including:
a spring activated sensor configured to detect pressure on the spring,
a conduction sensor configured to detect skin of the user,
an electric proximity sensor configured to detect an immediate presence of the user, or
a photoreceptor configured to detect that light is blocked by the head of the user.

Such a system may also include:
a camera that receives light from a visual field, wherein the glasses position verifier has a glasses and face registering optical processor that detects a human face and the glasses positioned on the human face based on the light received by the camera.

In such a system, the featured activity controller may interfere with the experience of the featured activity by blurring a monitor displaying the featured activity.

In such a system, the featured activity controller may interfere with the experience of the featured activity by at least one of preventing display of the featured activity; dimming a monitor displaying the featured activity; slowing a display of the featured activity; displaying a user glasses prompt; playing music prompting the user; and playing a message prompting the user.

Such a system may include:

a task prompter that prompts at least one of a caregiver of the user and the user when the signal indicates that the user is not wearing the glasses. Such a system may also include: a featured activity input that receives an input associating the featured activity with the featured activity controller.

In addition, the system may include: a second head detector that detects a proximity of a head of the user to a hearing aid and to generate a second signal accordingly; and a hearing aid controller that interferes with the experience of the featured activity by at least one of preventing an audio output of the featured activity; muting a hearing aid of the user; playing a user prompt.

Such a system may also include: a hearing aid controller that interferes with the experience of the featured activity by at least one of lowering a volume of an audio output of the featured activity; muting a hearing aid of the user; playing a noise reducing an ability of the user to listen to the featured activity; playing music prompting the user; and playing a message prompting the user.

Such a system may also include a caregiver interface to inform a caregiver of the user that the user is not wearing the glasses.

Such a system may also include a latency timer that tracks, as a latency length, a time between the detection of a signal indicating that the user is not wearing the glasses and a second signal indicating that the user is wearing the glasses.

Such a system may also include a latency trend tracker that tracks a plurality of latency lengths for the user and to determine at least one of an average latency length, a mode latency length, an increase in latency length, and a decrease in latency length.

In such a system the glasses position verifier may also verify that the glasses are within a preset range and may then generate the signal only when the glasses are within the preset range.

Also disclosed is a system that determines eye contacted by a first user wearing a first pair of glasses with a second user wearing second a second pair of glasses. Such a system would include:

a detector that determines that the second pair of glasses are substantially aligned with the first pair of glasses; and a signal generator that reports to the first user that a communication channel has been achieved based on the determination of substantial aligning.

In such a system, the detector may determine the substantial aligning by receiving a signal from a transmitter positioned on the second pair of glasses. Also, in such a system, the detector may determine the substantial aligning by detecting a unique identifier on the second pair of glasses.

Also described is a module for a wearer of a pair of glasses that aids in perceiving depth. Such a system would include a transceiver that transmits a signal to a surface ahead of the wearer and to determine a distance to the surface based on a returned signal; and a speaker that reports to the user the distance to the surface according to the determined distance.

In such a system, the transceiver may transmit a laser signal and provide visible light indicating the surface to the wearer.

Other features and advantages of the present invention will become apparent from the following description of the invention which refers to the accompanying drawings.

The figures of the Drawings illustrate examples of aspects of the invention. Other features and advantages of the present invention will become apparent from the following description of the invention, and/or from the combination of one or more of the figures and the textual description herein, which refers to the accompanying Drawings.

DETAILED DESCRIPTION OF THE EMBODIMENTS

An innovative technological approach is described that provides positive reinforcement of eyeglass wearing in special needs users, including children and adults. Smart eyeglasses are paired with a computer tablet or laptop via the transmission and reception of information detected by a protocol, for example using Bluetooth or other short range radio frequency transmission, that may be imbedded in both the eyeglasses and play objects, tablets or computer systems to determine if the user is wearing glasses. If the system determines that the user is not wearing glasses, the system may generate a prompt, such as a message or music to one or more caregivers and/or to the user, and may also, immediately or after a set time after the prompt, interrupt or interfere with the user interaction with the featured activity, for example, by blurring a monitor that the user is viewing to see a film or video, using to play a video game, or is interacting with or participating in some other electronic activity.

A software application may be run on one or more computer devices to provide a security login allowing access, for example for caregiver, such as a parent, teacher, occupational therapist, paraprofessional or other provider to associate: (1) a user, (2) a pair of glasses with a specialized module embedded or retrofitted on the frame, and (3) a featured activity with which the user who needs to wear the glasses will interact or participate in. Such a featured activity may include a video game, an educational or training application, a motion picture, film or video, an online activity, digital interaction with another user, or an activity that does not entail a screen of an electronic device, such as a game, an educational activity, occupational training, entertainment activity or the like. The software thus may control the conditions under which the user is allowed to engage with the featured activity and may train the user to engage with or to interact with the featured activity only when the user wears his or her eyeglasses. All such activity interaction between the eyeglasses and computer are stored locally on the device and the web.

This technology may use positive reinforcement, rather than non-contingent reinforcement, to build a positive association with wearing eyeglasses, which can result in the user being willing to wear their eyeglasses all (or most) of the time. Importantly, this approach may allow caregivers to work with ophthalmic professionals and ophthalmologists in the training process, and may provide quantitative data for evaluation.

Figure 11:
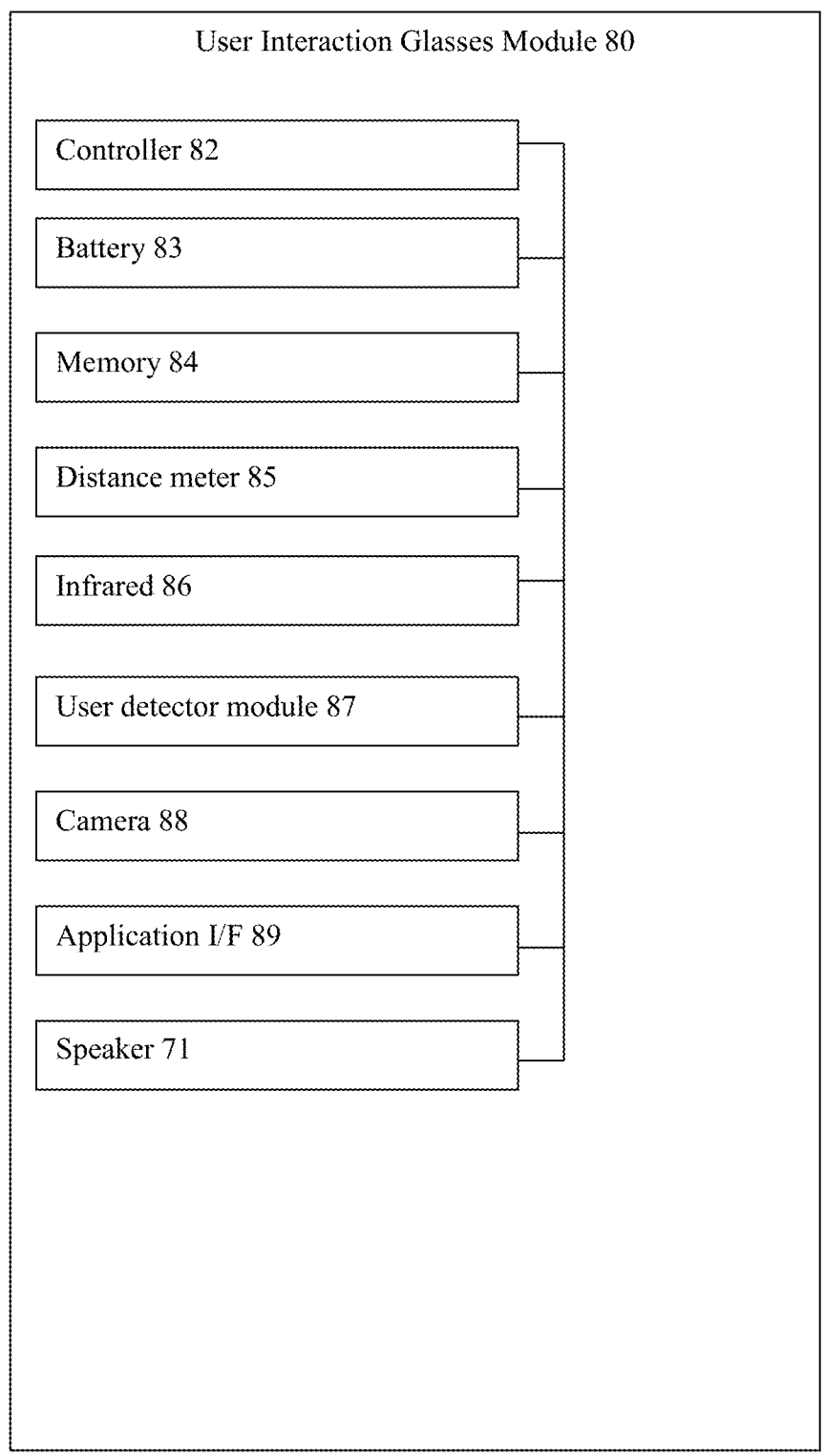
FIG. 11 is an illustration of an example of a user interaction glasses module for interaction with another user and depth perception according to an aspect of the present disclosure.
Figure 12:
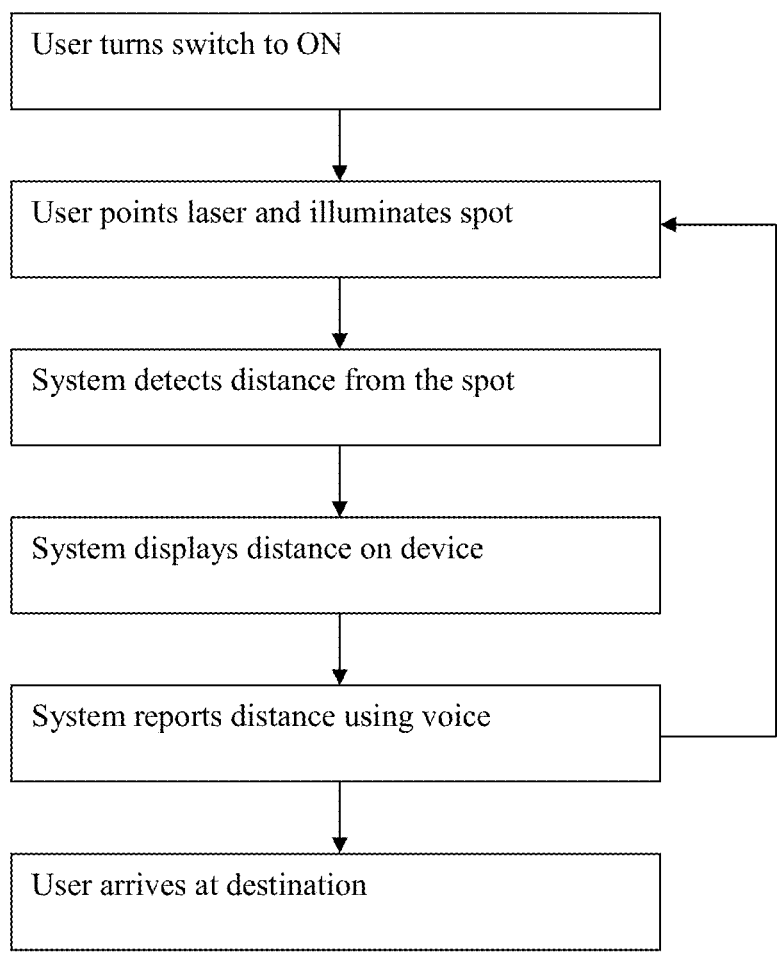
FIG. 12 is an example of a system process flowchart showing the depth perception feature according to an aspect of the present disclosure.

According to a further aspect of the disclosure, once an individual has been conditioned to putting on and wearing eyeglasses to address refractive problems, the eyeglasses may also have the capability to assist an individual in depth perception of an object in the user's field of view. This may be done by a glasses module reflecting light on objects to determine its three dimensional nature, for example, the light may provide a feedback mechanism where the next step is identified while walking down steps. As shown in FIG. 11, depth perception may be aided by a user interaction glasses module 80, using which user may be aided in judging how far objects are. For example, the user walking down a staircase may look down, thereby at the same time point an infrared laser pointer 85 to a step ahead, as described in FIG. 12. The user interaction glasses module 80 may include a distance meter 85 that automatically determines a distance to the object from which the infrared laser signal is returned so as to measure the distance to the object. This distance may be reported via voice to the user via speaker 71 or hearing aid 45 FIG. 9, displayed as a message, transmitted to a nearby device for voice output, or the like. It will be understood throughout the present disclosure that the light shined need not be a laser or infrared, and other frequencies may be used. Also the object to which module 80 is pointing need not be illuminated.

Two pairs of eyeglasses may each have the user interaction glasses module 80 shown in FIG. 11 equipped with either a transmitter or receiver, or a transceiver, using technology like an infrared transmitter and infrared receiver, or other frequency transceiver devices. Two users of eyeglasses equipped with such devices may facilitate eye contact training and engagement with another human. When the eyeglasses are substantially aligned such that the wearers are directly looking at each other, or are within a preset amount of offset from each other, for example by 10 degrees or less of directly looking at each other, user detector module 87 of user interaction glasses module 80 may determine that a communication channel with eye contact behavior has been established. Such a communication channel may be initiated by a trainer, instructor or other caregiver turning on the communication channel mode of the user interaction glasses module 80, in which one or both of the modules will be listening for the establishment of such a communication channel. For example, the user interaction glasses module 80 may have an ON switch directly in a housing thereof or may be activated from a remote device 30 in communication with it via application interface 89.

Figure 9:
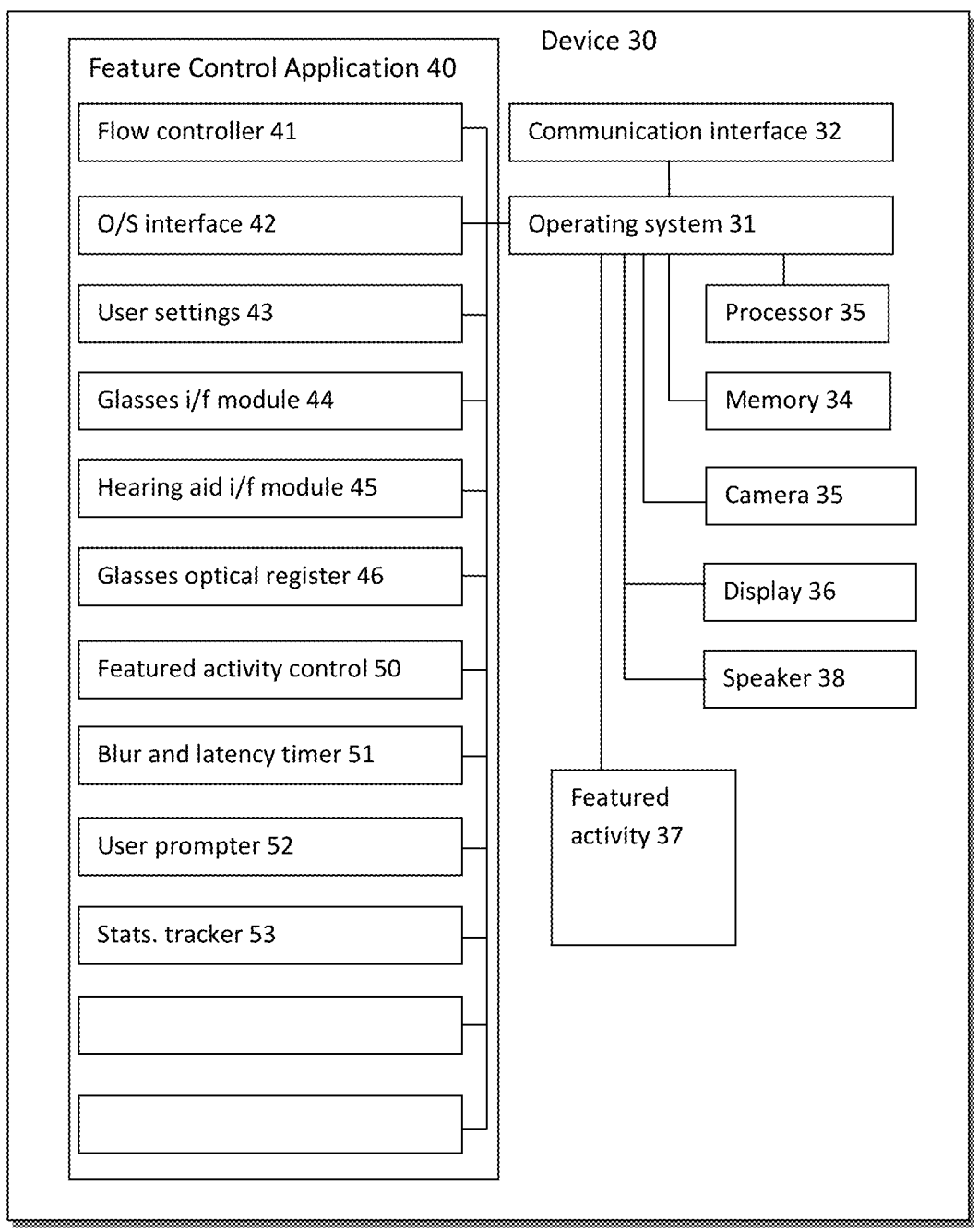
FIG. 9 is a schematic illustration of an example of a feature control application on a device with the featured activity, according to an aspect of the present disclosure.

Also, the processing for determining the establishment of the communication channel may be performed by remote device 30 FIG. 9, based on the user interaction glasses module 80 communicating to the remote device 30 that an infrared signal has been detected. User interaction glasses module may also include detector 67 to determine whether the glasses are being worn, as discussed elsewhere herein. User interaction glasses module 80, or one or more components thereof, or one or more functionalities provided thereby, may be integrated with, or provided in conjunction with, one or components glasses module 61 FIG. 10.

A reinforcing message, such as "Hello Johnny, Great to be with you today. Would you like to play a game of Connect Four?" may be played by speaker 71 or by module 69 FIG. 10 upon determination by controller 82 of the user interaction glasses module 80 that the communication channel has been established. It will be understood that many other types of such reinforcements may be provided, for example, a snippet of a jingle or other music, animal sounds, or the types of prompts described below. Similarly, a passive device such as a camera positioned on each pair of eyeglasses may be used to detect a unique signal written on or emitted by the eyeglasses to notify each participant to engage in conversation based on the system determining that a communication channel has been detected according to the detection of the unique signal. The conversation may be facilitated to proceed only when both transmitter and receiver are aligned based on the detection of the unique signal, and may be reinforced with a message as above described.

When two pairs of eyeglasses are communicating with each other then they teach eye contact behavior based on auditory and visual cues being transmitted and received. The device 30 (e.g. tablet or PC or the like) may communicate with the user interaction glasses module 80 of one or both of the two pairs of eyeglasses. The transmitter of application interface 89 may send information on the condition of the sensory stimuli and auditory stimuli to device 30 so that progress of the user as elsewhere described herein may be stored and tracked. The receiver of device 30 may thus detect the visual and auditory information and process the data on the tablet or PC.

According to a further aspect of the disclosure, a camera 88 in FIG. 11 on each pair of glasses detects a face wearing glasses, which is the face of the other user with glasses. A communication channel would be deemed to be established by the system when one or both modules detects that the faces with glasses are detected. According to a further aspect of the disclosure, the system may keep a tally of the number of times such a communication channel is established, the duration of each communication channel session (the length of time that the channel is maintained), the frequency with which channels are established in the course of an hour, day or other period, or a change or trend in the foregoing.

The auditory and visual stimuli take the form of speech, reading material, or other types of information emanating from other subjects or different objects but synchronized by the transmitter and receiver embedded in the eyeglasses.

A web application may capture the data stored either on the device 30 (e.g. computer or tablet) playing the featured activity 37 (e.g. movie or game) and may store the data and/or transmit it to the web for review and analysis. Functions that train special needs children to put on eyeglasses and to resides on the PC or Tablet The caregiver may initially show the user that the eyeglasses fitted with the module that wearing the eyeglasses makes the computer game more visible. The smart eyeglasses technology detects eyeglasses in its field of view. For example, a tablet or other computer with the featured activity, or another device, may be equipped with an application that detects a presence of the glasses with the module within range. For example, if the module on the glasses is within 6 feet, or within another specified distance set by the caregiver depending on the nature of the featured activity, screen size, visual impairment of the user, and/or other such factors, and the module on the glasses detects that the presence of the user's head, then the featured activity is allowed to proceed. The system may have technology that detects whether the eyeglasses will be on the individual's face. A software implementation according to an aspect of the disclosure will be described with respect to FIG. 9. Feature control application 40 may reside on device 30 and may include a flow controller 41 that controls the flow of the feature control application 40. User settings 43 interacts with a user via OS interface 42 of the application interacting via operating system 31 with the outside world via communication of interface 32 of device 30. User settings 43 may receive input from a caregiver to register a user and to associate glasses module 61 of glasses 60 with a featured activity 37 being controlled by feature control application 40 on device 30. Other user settings, such as the required minimum and maximum proximity of glasses module 61 on glasses 62 to the device 30 may also be received by user settings 43. For example, caregiver may want to specify that the user needs to be no more than 4 feet or no more than 6 feet from the screen of device 30, or no less than 10 inches from the device 30, depending on the prescription of the glasses of the user, the size of the screen, and the nature of the featured activity 37. The caregiver may want to specify the onset of the first blur, battery settings in Module 80, density of blur and other related parameters.

User Detection

Glasses optical register 46 may interact via operating system 31 of device 30 with a camera 36 of device 30 to detect a face and to detect glasses on the face within the visual field of the camera using known facial recognition processing. Such a determination may suffice in determining both that the user and his or her glasses are within acceptable proximity and that the user is wearing the glasses. This may obviate the need for a detector 67 on the glasses module 61 to detect immediate proximity of the glasses 60 to a user's ear or head, however, such a detector 67 may nevertheless be provided.

In the alternative, or in addition, proximity of the glasses module 61 may be determined by feature control application 40 according to a strength of a Bluetooth signal, or other short range radio frequency signal, being emitted by glasses module 61, or according to a signal to noise ratio of the same. On the other hand, glasses module 61 may determine the proximity of the device 30 by the strength of a Bluetooth or other short range radio frequency signal being emitted by device 30, or by a signal to noise ratio thereof. For example, a test signal may be generated pursuant to instructions generated by glasses interface module 44 commanding communication interface 32 of device 30 to emit signal.

Figure 1:
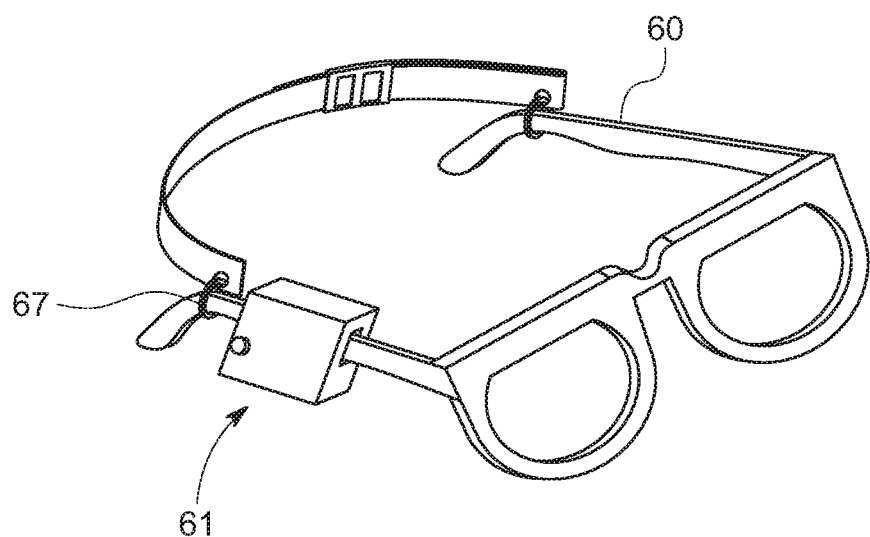
FIG. 1 is an illustration of an example of glasses and a glasses module according to an aspect of the disclosure.
Figure 2:
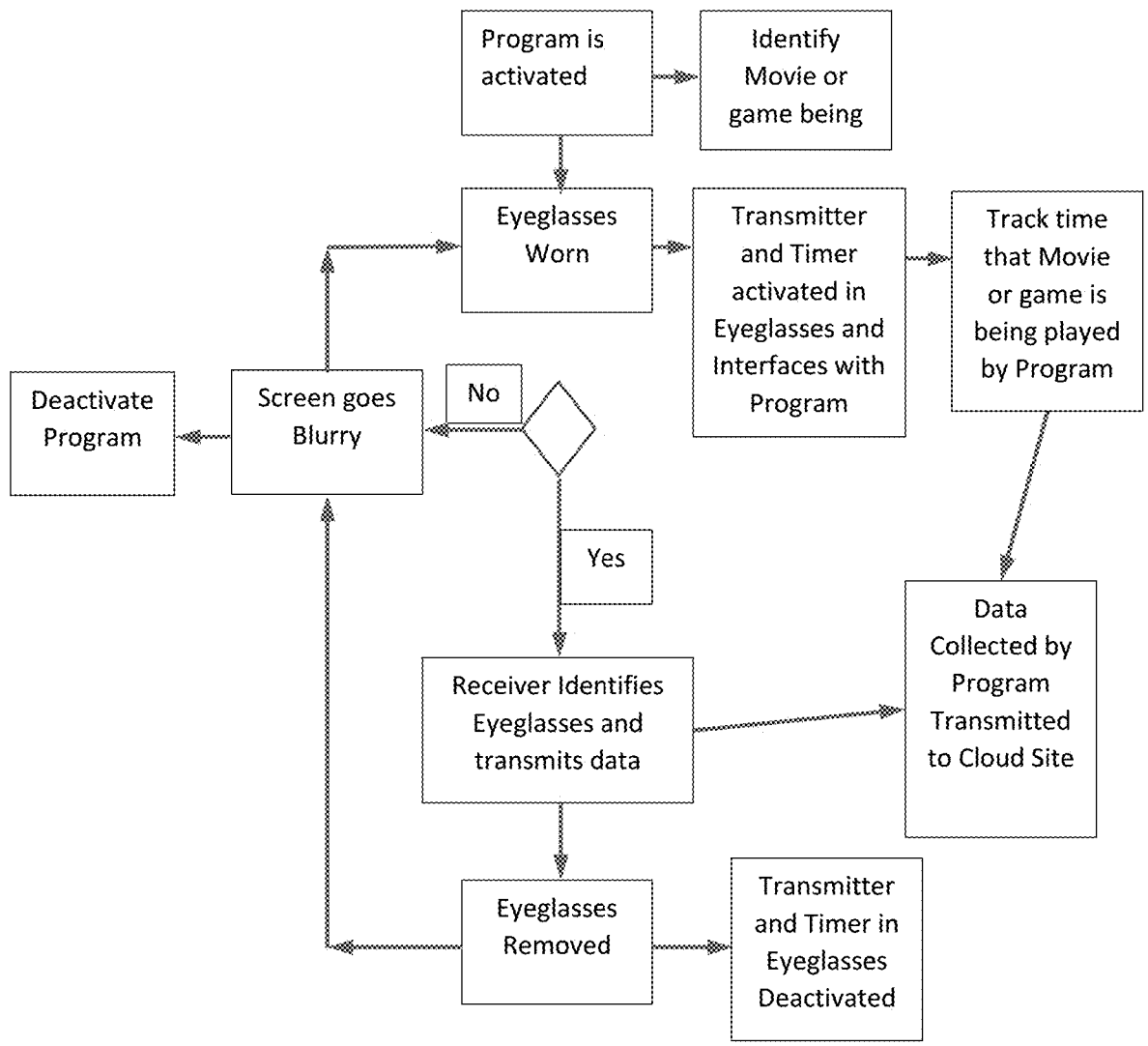
FIG. 2 is an illustration of an example of a system process flowchart according to an aspect of the disclosure.
Figure 3:
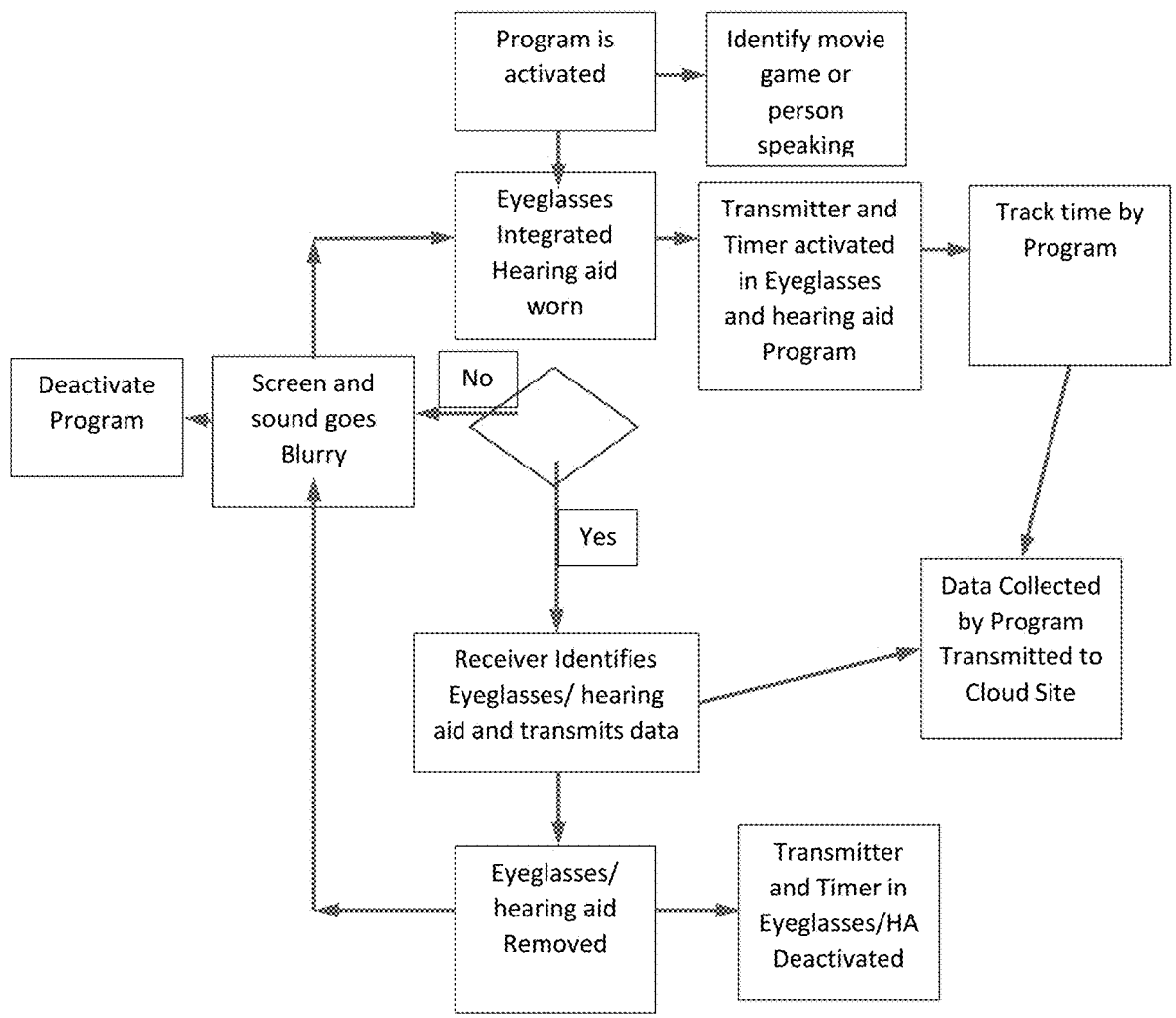
FIG. 3 is an illustration of another example of a system process flowchart, according to an aspect of the disclosure.
Figure 4:
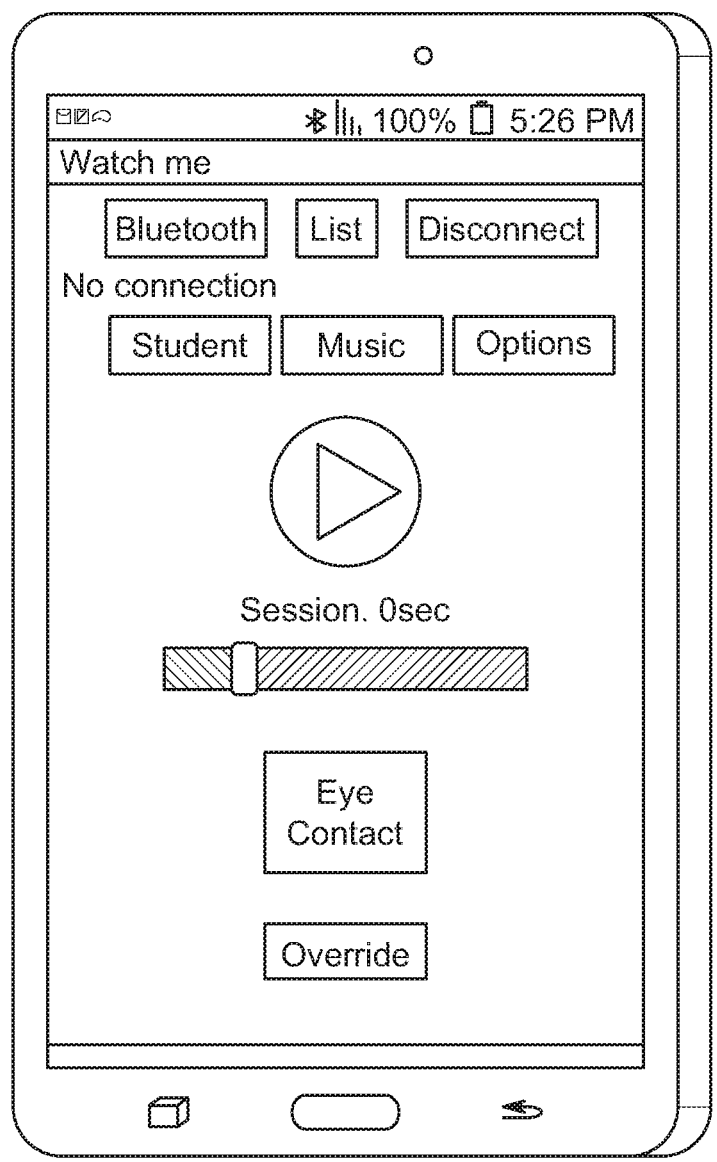
FIG. 4 is an example of a screenshot of a feature control application of a system in operation according to an aspect of the disclosure.
Figure 5:
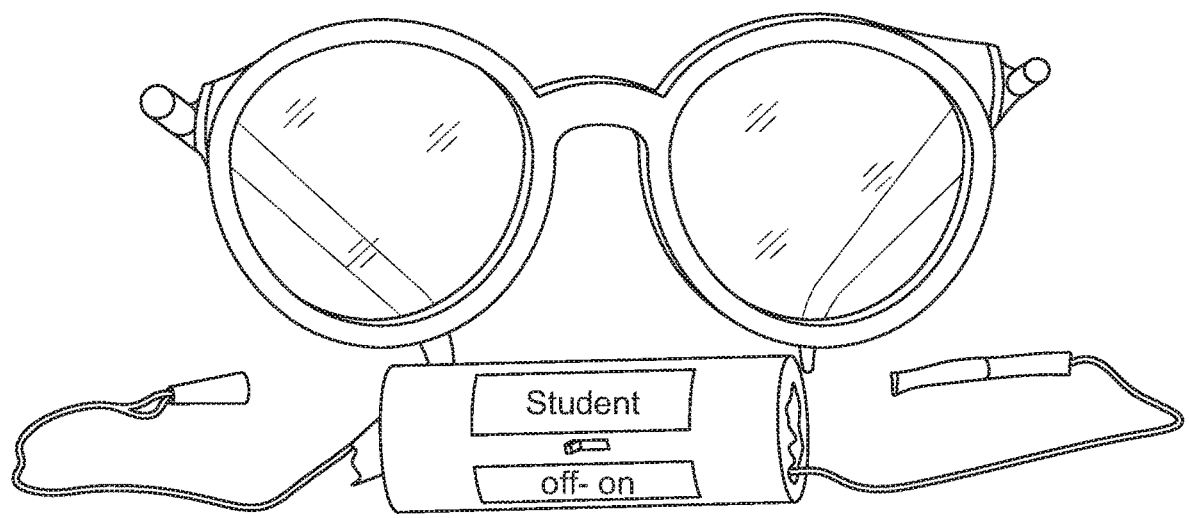
FIGS. 5 and 6 are illustrations of an example of the glasses and the glasses module, according to an aspect of the disclosure.
Figure 6:
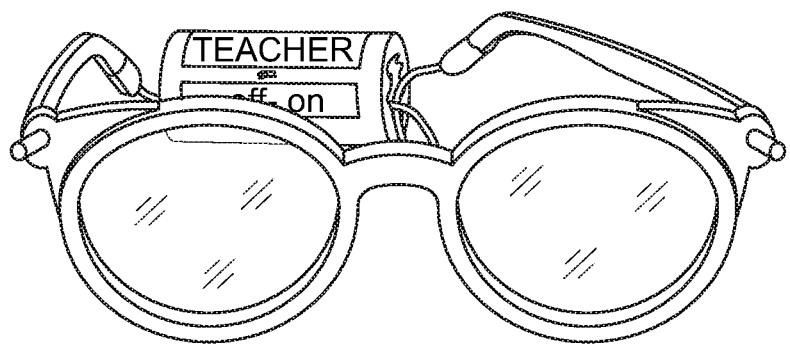

Glasses module 61 FIG. 1 may also include a user head proximity detection system to determine whether the user is actually wearing glasses. The detection system may include one or more of a spring activated pressure sensitive sensor 67a that detects whether a spring is being depressed by an ear or a head of the user as the frame of glasses 60 sits on the ears and head, a conduction sensor 67b that is sensitive to whether the ear or scalp skin or hair of the user is sensed immediately adjacent the sensor, and a photoreceptor 67c that determines whether the sensor is covered or uncovered by user's head or a portion of the users ear immediately adjacent the glasses module 61 FIG. 10.

Thus, for example, if the user proximity detector 67 determines that the user is wearing glasses, and if the glasses optical register 46 determines using facial recognition processing detects a face with glasses a place within the visual field of camera 35 of device 30, then it may be determined that the user is wearing glasses and is interacting appropriately with device 30. As discussed, the proximity of the glasses module 61 to device 30 may also be determined in other ways, for example, by the strength of the Bluetooth signal or other type of radio frequency signal through which device 30 and glasses module 61 are communicating.

Also, the glasses module 61 may detect a presence of a device 30 in other ways, for example, by a sensor that detects a presence within an acceptable range of an electronic signal, a light frequency signature of a monitor or display of an electronic device, that is by a characteristic "blue" light frequency or a set of light frequencies typically emitted by the monitor or screen of an electronic device, or the like. In addition, other types of signaling may be provided between device 30 and glass module 61 either to communicate or to detect are each other's presence, for example, infrared frequency may be used. Such detection in combination with detection by detector 67 of the user actually wearing the glasses may be sufficient to judge that the user is both within acceptable range and is wearing the glasses.

Prompting the User and Caregiver and Controlling the Featured Activity

If it is detected that the user is not wearing the glasses 60, or if it is detected that the user is wearing the glasses but is not proximate to device 30, then user prompter 52 of the feature control application 40 may prompt the user and/or the caregiver of the user to wear the glasses or to get near the device 30.

A range of prompts maybe used, for example, voice recordings of the caregiver to prompt the user, familiar or repeated music, a written message, or a video may be displayed to the user reminding the user to wear glasses, and so on. Similarly, the caregiver may be prompted in a range of such ways, and alerts may also include text messages sent to the caregiver via a cellular system, or via a WIFI system, telephone calls, automated voice messages, and the like. Also, repeated prompts to the user and/or to the caregiver over a period of time may be provided with increasing volume or with increasing severity level according to how much time elapses between: (1) detection of the user not wearing glasses and/or not being proximate to device 30, and (2) the user donning the glasses. This elapsed time may be called latency. According to an aspect of the system, statistics tracker 53 FIG. 9 of the feature control application 40 may keep track of latency or duration and may provide a summary of average tendency over time, for example, over the course of a day or week of training. In this way, a tendency may be determined, for example, that latency is getting shorter over the course of a week of training, signifying that the user is learning to put on glasses when prompted, and thus that the system is performing well and is providing a valuable service to the user.

If after a set period of time, the user is still not wearing glasses and is within range, the feature control application 40 may begin to interfere with the experience of the user interacting with the featured activity 37. A range of interfering actions may be taken by blur controller 51, for example, display 36 of device 30 may be blurred, a volume of the featured activity 37 may be lowered, the speaker 38 of device 30 may be muted (or audio output of just the featured activity 37 may be suppressed or stopped), the display 36 of device 30 may be dimmed or made to have less contrast, an educational video advocating the importance of wearing glasses may be displayed or shown, the display rate of the featured activity 37, for example, the game or the film, may be slowed, or a background noise, or a white noise or static or the like may be played on the audio system 38 of device 30. Blurring may be implemented by turning off some or most of the pixels of the monitor of device 30. For example, half, two thirds, three quarters or more of the pixels randomly or throughout the display of the featured activity may be turned off or may be set to a particular neutral setting. Also, as the user continues to avoid putting on the glasses and/or putting on the hearing aid, additional pixels may be turned off to increase the blurring effect.

If it is then detected that the user is again wearing the glasses and is within range, then the interference with the featured activity 37 FIG. 9 is stopped and normal interaction with the featured activity is enabled. This elapsed time may be called latency or duration plus blur time. According to an aspect of the system, the statistics tracker 53 of the feature control application 40 may keep track of this latency, duration or plus blur time, and may provide a summary of average tendency over time, just as with latency time alone, so that learning by the user to put on the glasses can be tracked.

The glasses module 61 will now be described according to an aspect of the disclosure with respect to FIG. 10. Glasses module 61 may include a controller 62 that controls overall operation of the glasses module 61 and controls via application interface 70 communication with the feature control application 40 residing on device 30. Controller 62 may be implemented on one or more of a semiconductor chip, PCB (printed circuit board) or the like, as hardware, software, firm wear or as a combination of the foregoing. Glasses module 61 may include a battery 63 that provides power to the controller 62 and to other electronic components of glasses module 61, and a memory 60 for that enables operation of control or 62.

Figure 10:
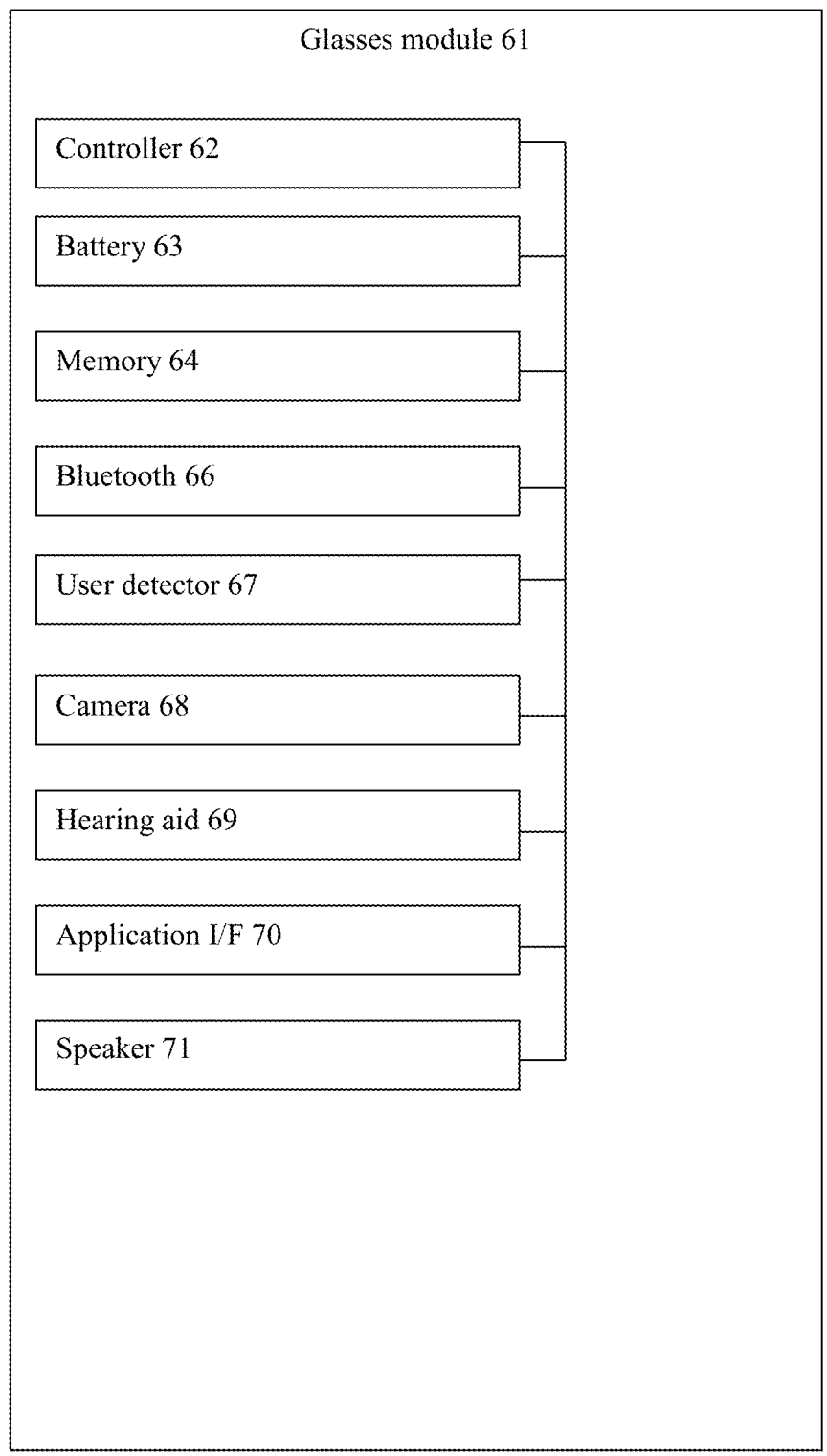
FIG. 10 is an illustration of an example of a glasses module according to an aspect of the present disclosure.

A Bluetooth component 66 FIG. 10 may provide communication with the feature control application 40 of device 30 via the communication interface of device 30. Bluetooth component 66 may also provide a signal that enables detection of the proximity of the glasses module 61 to the device 30. Bluetooth component 66 may be equipped with its own communication chip or modem and may be a physical unit separate from the glasses module 61 and connected thereto.

While described as a Bluetooth component 66, it will be understood that other types of short range radio frequency communication protocols, and other radio frequency and other non-radio frequency communication may also be used.

User detector 67 is a component of glasses module 61 that controls the detection of the presences of the user or of the users head, as discussed above. User detector 67 may include any of the types of sensors discussed above or may provide other types of sensors.

Glasses module 61 may also include a camera 68 to detect a presence of another user wearing glasses with a module similar to glasses module 61. For example, glasses module 61 may include an optical detection processor inside controller 62 so that signal from its camera 68 can be analyzed to determine whether a face wearing glasses is present within the visual field of camera 68. In this way, the presence of another user wearing glasses may be determined. This may be useful when the featured activity includes interaction with another user. For example when performing an educational task or engaging in an educational activity together that does not involve an electronic device, the optical processor of the controller 62 of each glass module 61 worn by the respective user may determine that the other user is wearing glasses. That is, the glasses module 61 of each user will determine whether a face with glasses is detected within the visual field of its camera 68. In this way, two glasses modules 61 can determine that both users are wearing glasses appropriately. If they determine that one of the users is not wearing the glasses, then the appropriate caregiver and/or the appropriate user may be prompted as described above.

Also described is a hearing aid module 69 that controls the hearing aid of a user who needs such a device. A single integrated module in a single housing that includes both the hearing aid and the glasses module 61 may then be provides. This is the implementation shown in FIG. 10. Hearing aid module 69 may be provided in housing separate from glasses module 61 and, in fact, may be provided independently of glasses module 61 at or behind the user's ear.

The presence of the hearing aid module 69 may be determined in a manner analogous to the detection of the glasses module 61. That is, the system may determine independently whether the hearing aid 69 is being worn by the user and may determine whether the hearing aids module 69 is within an acceptable approximate range of the device 30 that has the featured activity 37. In the manner described above with regard to the glasses module 61, the hearing aid module 69 may comprise its own user presence detector 67 to determine that the user is wearing the hearing aid module at 69. Also, in the manner described above with respect to the glassed module, the system may determine whether the hearing aid module 69 is within an acceptable range of the device 30 being controlled by the feature control application 40. Similarly, in the manner above described with respect to the glasses module 61, hearing aid module 69 may independently determine whether device 30 with the featured activity 37 is within range of the hearing aid module 69. In the alternative, if both glasses and a hearing aid are prescribed for the user, then a single determination may suffice for both the wearing of the hearing aid and the glasses, and the proximity of the hearing aid and the glasses to the device 30 with the featured activity 37. The hearing aid module can be set to work concurrently so that both auditory and visual stimuli are presented concomitantly.

According to a further aspect of the system, if it is determined that the user is not wearing the hearing aid, or is wearing the hearing aid by the hearing aid is not within an appropriate proximal distance of the device 30, then the user and/or the caregiver may be prompted as described above with respect to the glasses module. In an analogous manner, if after a time the user is and not wearing the hearing aid after being prompted and after the caregivers prompted, then interference with a featured activity 37 may begin, for example, by muting the hearing aid and or meeting the featured activity and in the manner described above. Then, if the hearing aid is put back on, normal experience of the featured activity 37 may be resumed.

Latency and duration times and blur times (mute times, etc.) may be measured, collected, averaged and reported together with trends in improvement of wearing by the user. In this way, the user may be trained overtime to wear the hearing aid more consistently as prescribed. Frequency and duration of the times that the user is detected to remove the glasses or is not within proximity may also be recorded.

The featured activity, such as the computer game, may be set to be played for a maximum time according to the user's needs. For example, feature control application may allow a maximum of 45 minutes of playtime. The system may calculate total duration of eyeglasses wearing during this time.

While the hearing aid component is sometimes referred to as a software application, it will be understood that feature control application 40 may be implemented as hardware or a combination of software, firmware and hardware. Similarly, controller 62 of the glasses module 61 may be implemented as software, hardware or firmware, or a combination of the foregoing. Also, while feature control applications 40 is described as residing on the same device 30 as is the featured activity 37, it will be understood that feature control application 40 may reside on a separate device and may control featured activity 37 remotely, for example, via a local area network, such as a Wi-Fi network, or in other ways.

For example, featured activity 37 may reside on a device separate from device 30. Featured control application 40 may be associated with the featured activity 37 via a separate controller app residing on the device on which featured activity 37 is being played or being run. Thus, feature control application 40 may communicate with this separate application to control featured activity 37.

Also, while shown as a single application, one or more components of feature control application 40 may be provided on separate devices. For example, the caregiver may have an application on his or her personal mobile device, such as a smart phone, table or laptop, that has a prompt or function that provides alerts and prompts to the caregiver as described herein, while other components of feature control application 40 may reside on device 30. In the alternative, or in addition, glasses detector and detection functions of feature control application 40 may be provided on a separate device, for example, a standalone device for detection of the user and the glasses of the user may be provided and retrofitted onto another device. These components and the glasses module 61 or components thereof may communicate with each other directly via Bluetooth or via another ad hoc network, or using signaling using a common node, such as a WIFI router or other wired or wireless connection.

Figure 7:
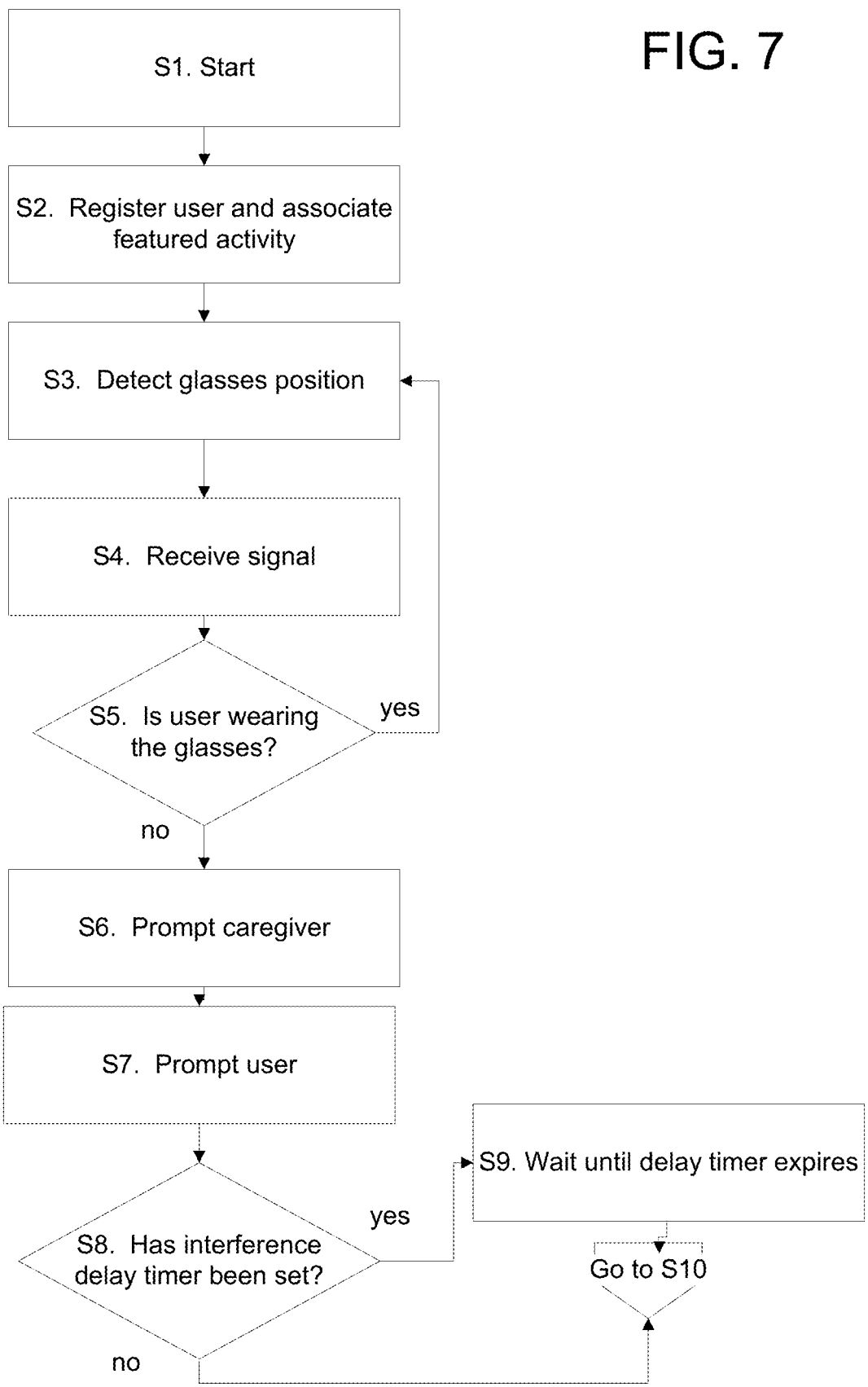
FIGS. 7 and 8 are an example of a system process flowchart according to an aspect of the present disclosure.
Figure 8:
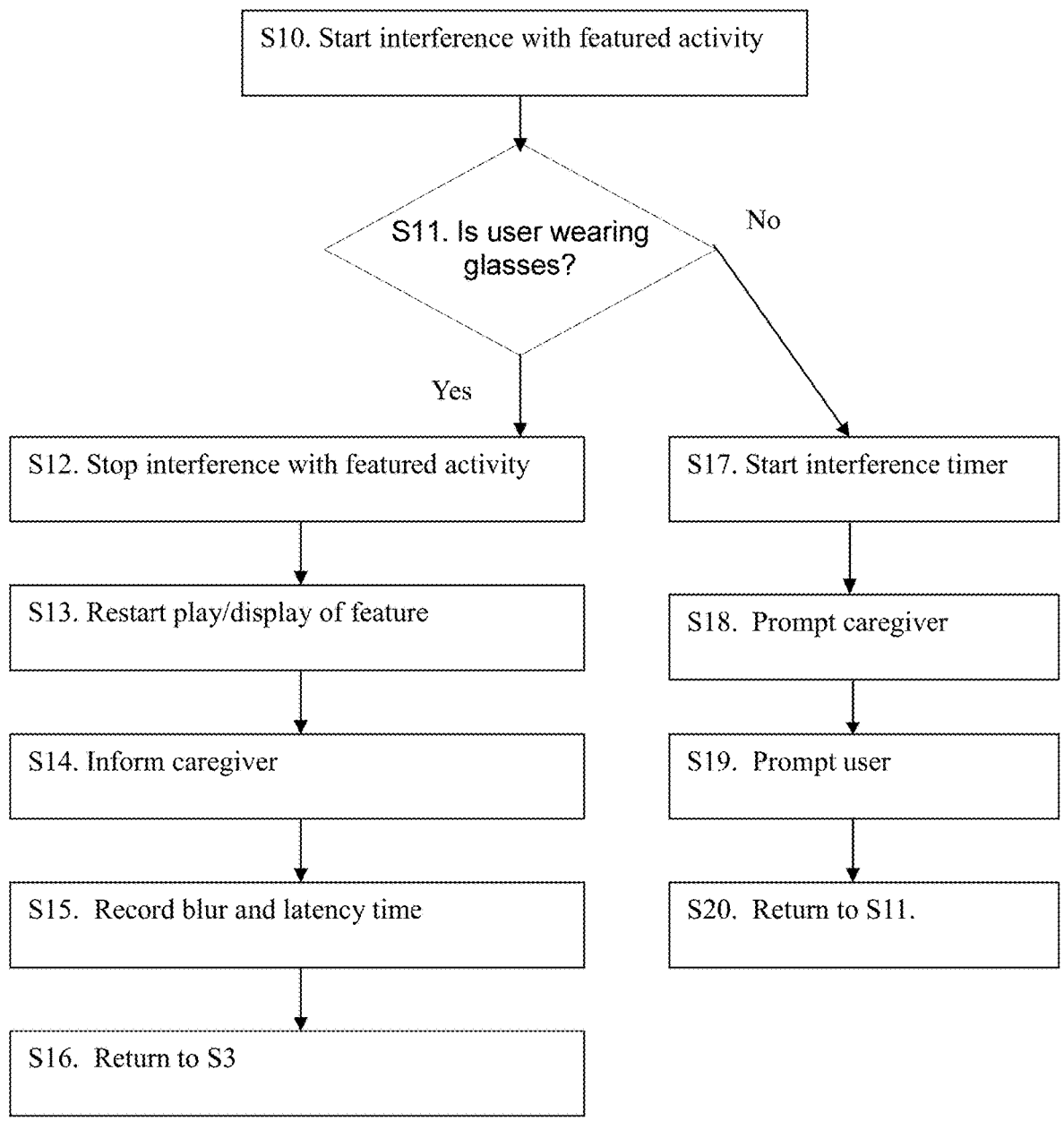

A process flow is shown in FIGS. 7 and 8 according to an aspect of the disclosure. According to the example process illustrated in FIGS. 7 and 8, the system is started at S1, for example, caregiver may decide to begin training of a user to wear glasses and set up the system and may install module 61 on glasses 60. However, glasses module 61 may be built in part as an integrated part of glasses 60 or the glasses frame.

The user may then be registered at S2, for example, by entering the user's name and by pairing or associating the glasses module 61 with the device 30. Also, a featured activity 37 made at this time be associated with the user and the feature control application 40 so that feature control application 40 may thereby control a featured activity 37. The caregiver may then provide instruction to user to encourage the user to wear glasses, at least when interacting with or engaged in featured activity 37. It will be understood that a number of featured activities 37 may be associated with and be controlled by feature control application 40, or all interaction with device 30 may be placed under control of feature control application 40, so that the user is trained to wear glasses when interacting with any or each of the controlled featured activities.

At S3, glasses module may then detect whether the glasses are in position. The application feature control application 40 may then at S4 receive a signal according to the detection of the glasses on the user's ear or head at S3. If at S5 feature control application 40 determines that the user is wearing the glasses, and then system returns to S3 to sample periodically the position of the glasses. This sampling may be repeated every second or every tenths of a second etc. depending on sampling rate.

At S5, the system then detects whether the user is wearing the glasses and is within an appropriate range of device 30 on which featured activity 37 is running or with which the user is interacting. If, on the other hand, the feature control application 40 determines at S5 that the user is not wearing the glasses, or is not within range, then at S6 a prompt may be provided to caregiver, and or at S7 a prompt may be provided to user.

A time delay may be provided for the user to put on the glasses before interference with the featured application is begun. At S8, it is determined whether an interference delay timer has been set and if it has, then at S9 the system waits for the delay timer to expire. During this lag time or latency time the user may be repeatedly prompted using a variety of prompts to don the glasses. Also, caregiver may be periodically issued alerts.

When this delay timer expires, or if no time has been set then immediately, the next step is begun and the system proceeds to S10 as shown in FIG. 8.

The system at S10 begins interference with the featured activity. At S11, it is determines whether the user is wearing the glasses again and, if so, as shown at FIG. 8, at S12, feature control application 40 ceases interference with the featured activity. As shown at S13, play or display of the featured activity 37 is restarted, and at S14 the caregiver may be informed that the user is once again wearing glasses as prompted. At S15, the blur and latency time are recorded so that progress of the user may be charted. Control flows back to S16. Glasses module will also track the duration of glasses wearing independent of Device 30. When device 30 is in range of the glasses Module 61 it will transmit times stored to Device 30 through Bluetooth or on such similar communication channel.

On the other hand, if at S11 it is determined that the user is not wearing the glasses, and then an interference timer is started at S17. The caregiver may be prompted at S18, and the user may be prompted at S19, and control flows back to S11. This is repeated until the system determines that the user is wearing eyeglasses.

While the present invention has been described thus far in relation to autistic children, its applicability is extendible to other situations, for example for treating amblyopia. Amblyopia, also called lazy eye, is a disorder of sight in which the brain fails to process inputs from one eye and over time favors the other eye. It results in decreased vision in an eye that otherwise typically appears normal.

As shown in FIGS. 13-16, the present inventor has also perceived a Virtual Training Device (VTD) 100 as a novel and innovative technology platform to positively reinforce spectacle wearing in children with physiological disorders, e.g. refractive amblyopia. VTD 100 is a smart low-cost device to automatically train children with refractive amblyopia to wear their spectacles using self-motivation, thus improving compliance and vision early on in a child's development.

The invention senses whether or not children wear their spectacles. In addition, it serves as a visual training program that pairs a PC or tablet 99 with highly valued reinforcers like educational and/or entertaining movies of the parent's or child's choice. The screen 97 on the PC/tablet remains in focus when the child is wearing spectacles but becomes blurry when spectacles are removed. This technology uses automatically delivered positive reinforcement, rather than the use of response blocking or other procedures that require active intervention by an examiner or caregiver, to build a positive association with wearing spectacles and promote habituation to the novelty of wearing spectacles. The ophthalmologist, optometrist and parent can obtain quantitative measurements of the duration of compliance, reducing the need for subjective measures.

Figure 13:
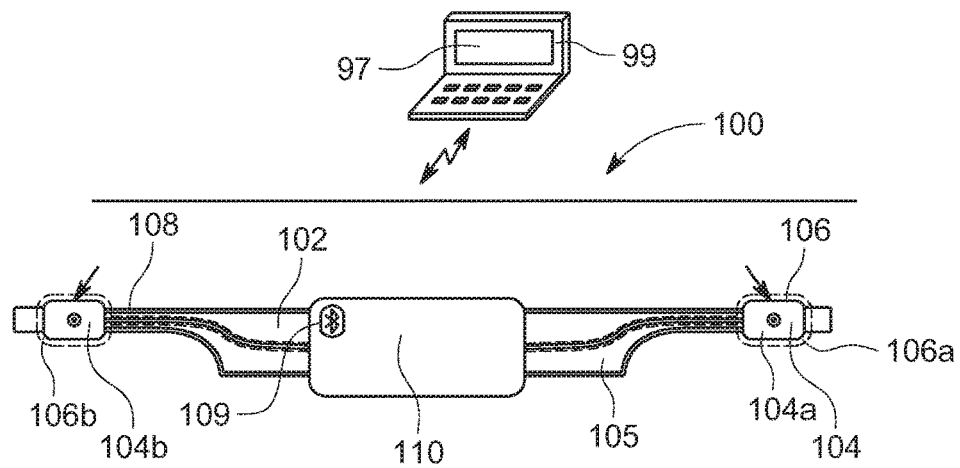
FIG. 13 is a block diagram of another embodiment of the invention adapted for use with children suffering from the lazy eye syndrome.

As shown in FIG. 13, the VTD 100 includes a wearable band (WB) 102 designed to fit a child's spectacles and functions as a transmitter to the PC/tablet application receiver. The WB 102 consists of two stretchable hoops 104 generally in the form of two fabric sleeves 106a, 106b, configured to receive therein the temples of the child's personal spectacles. The wearable band 102 is fitted with two enclosures, one housing a Bluetooth low energy (BLE) powered microcontroller (μC) 120 that communicates with the PC/tablet 99 (which may be a Windows 10 system) and small hidden switches 104 on left (104a) and right (104b) temples to detect the spectacles being worn by the child.

Figure 14A:
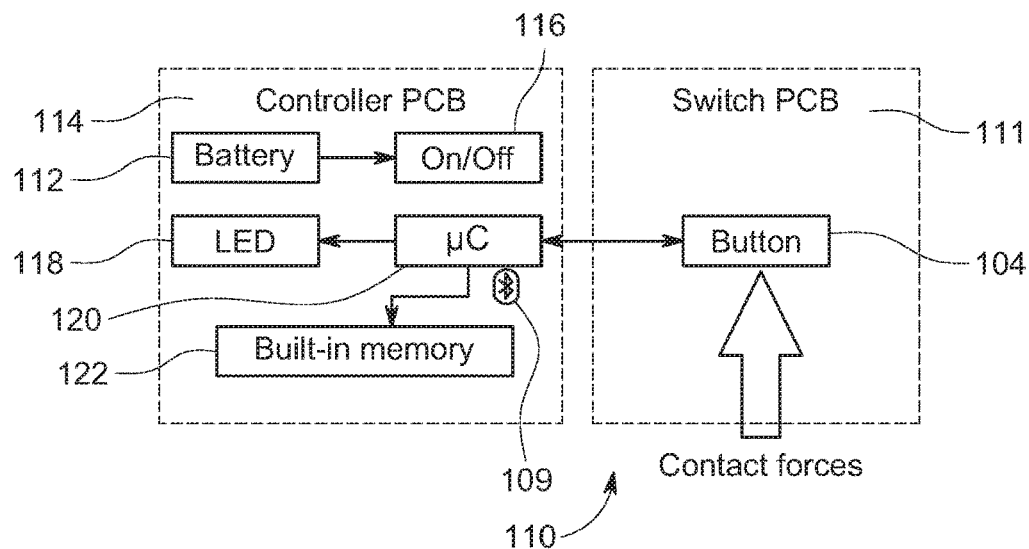
FIGS. 14*a* and 14*b* are block diagrams of hardware and software components of the embodiment of FIG. 13.

FIG. 14a shows the electrical overview of the product design. The μC 120 connects with the switches 104 on either temple to detect and record the timestamp of the spectacles being worn by the child. Additionally, the transmitter 109 is fitted with a built-in memory 122 to store data in outdoor environments when there is no connectivity to the PC/Windows 10 tablet. The receiver will obtain timestamps of the spectacles being worn.

Figure 14B:
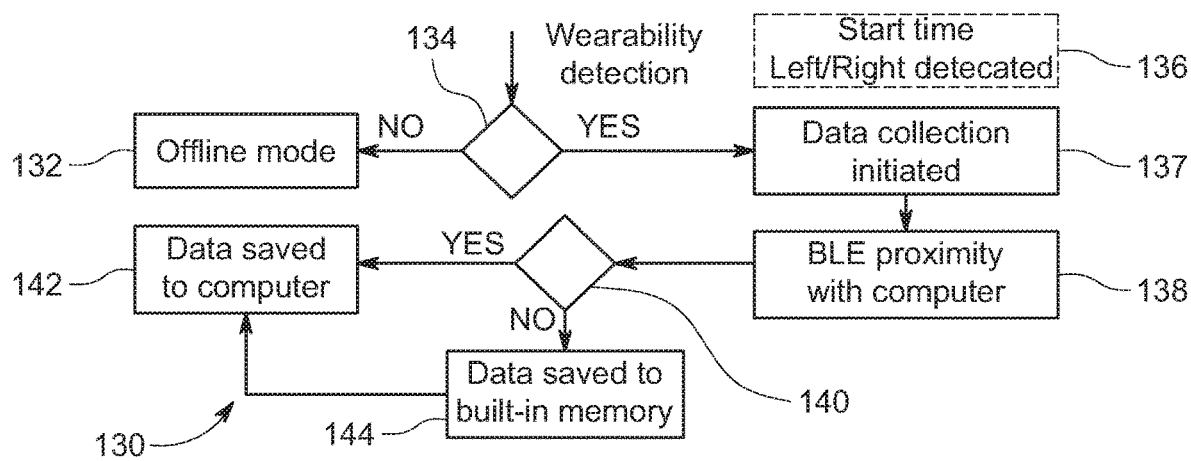

FIG. 14a shows the electrical signal flow diagram and software architecture programmed for the wearable band, and shows it to include a battery 112, on/off local switch 116, LED 118 that allow the uC 120 to communicate with the switch PCB 111 that houses the buttons 104. FIG. 14b shows the communications software architecture in PC/Windows 10 tablet receiver, including the software flow 130 that queries at 134 whether the device is in an offline state 132. Otherwise, the blocks 136, 137, 138, 140, 142 and 144 attend to logging time that the spectacles are worn and saving the data relevant data for active or later sending to the tablet 99.

Figure 15:
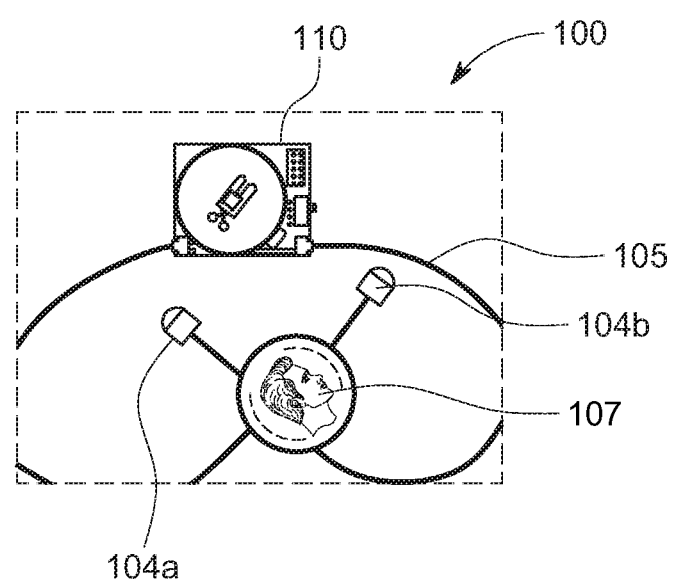
FIG. 15 depicts the relative sizes of the devices in FIG. 14*a*.
Figure 16:
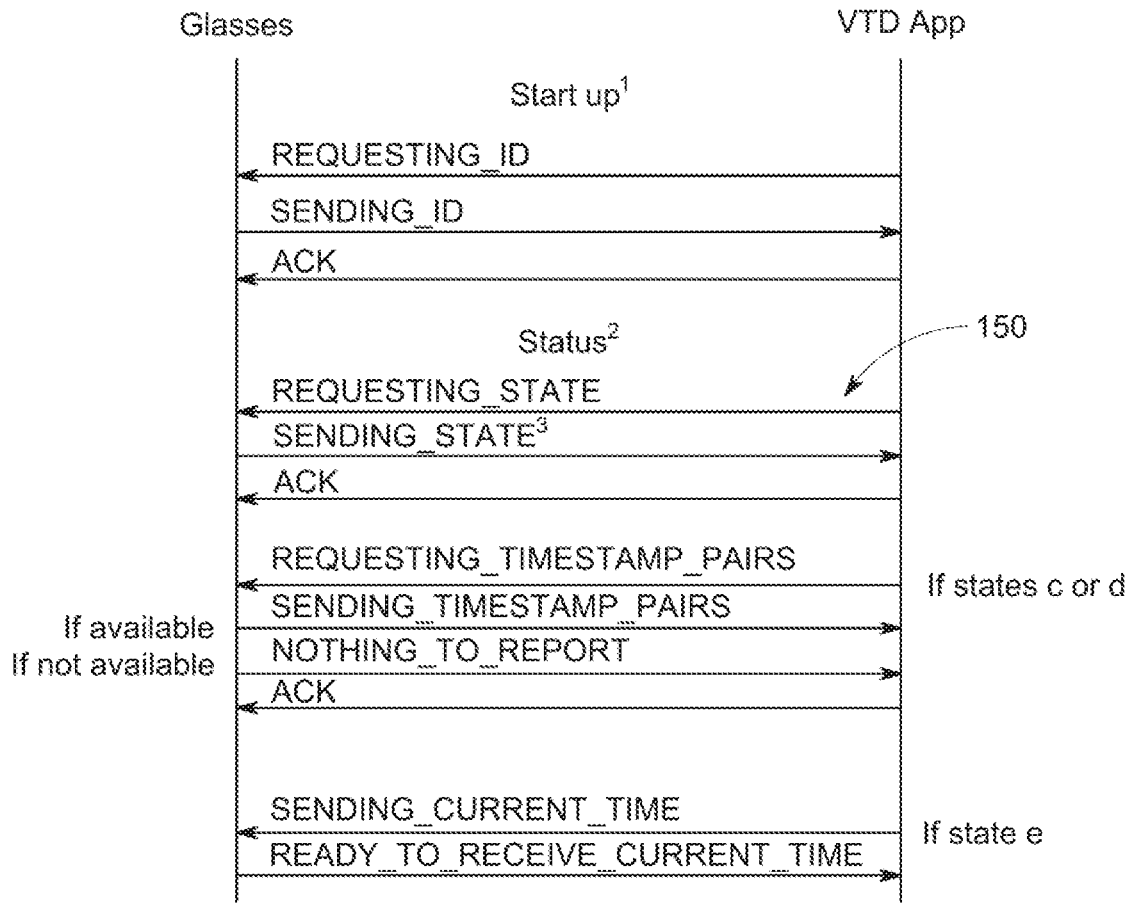
FIG. 16 is a timing and flow chart for the software of FIG. 14*b*.

FIGS. 15 and 16 show the PCB 110 and the electrical wires 105 that lead to the switches 104a/104b, including the coin 107 that provides a measure of the size of these components. In FIG. 16 the overall flow 150 is charted textually.

In operation, the VTD 100 is attached to a child's spectacles, continually detecting whether the child is wearing them or not. When the transmitter is in the proximity of a PC/Windows 10 tablet running a companion program, it transmits a history of the child's wearing (or not) of the glasses since the last connection. While the program is in communication with the transmitter, the screen 97 will blur whenever the child is not wearing the glasses and remain clear when the spectacles are worn. Thereby, if the child wants to watch their favorite movie, she/he will need to wear the eyeglasses. The program also captures pictures at periodic intervals to determine whether the child is facing the screen, e.g., via a camera located on/in the PC/tablet 99.

Thus, as revealed by FIG. 15, the transmitter/receiver platform of this embodiment comprises three basic components; a transmitter secured to a pair of spectacles, which communicates with a PC, a laptop processor and/or tablet receiver (see Diagram for the communication process). The receiver stores and then transmits the data to the Web for analysis. FIG. 16 provides a timing chart for the operation of the transmitter/receiver platform.

Although the present invention has been described in relation to particular embodiments thereof, many other variations and modifications and other uses will become apparent to those skilled in the art. Not all components or steps described or illustrated herein need necessarily be present. Components and steps described herein may be provided in other combinations or sequences than as presented, or may be omitted entirely. It is preferred, therefore, that the present invention be limited not by the specific disclosure herein, but only by the appended claim.

What is claimed is:

1. A system for detecting that a user interacting with a featured activity is wearing glasses, the system comprising:
said featured activity provides informative, educational or entertainment content via a display monitor;
a glasses position verifier configured to verify that the user is wearing the glasses and to provide a signal accordingly to a featured activity controller; and
the featured activity controller configured to interfere with an experience of the featured activity when the signal indicates that the user is not wearing the glasses, and
wherein the featured activity controller is configured to interfere with the experience of the featured activity by transmitting to the display monitor a signal that instructs the display monitor to blur the displaying of the informative, educational or entertainment content of the featured activity by turning off some or most of pixels of the display monitor while the glasses are not worn.

2. The system according to claim 1, wherein the system further comprises:
a task prompter configured to prompt at least one of a caregiver of the user and the user when the signal indicates that the user is not wearing the glasses.

3. The system according to claim 1, wherein the system further comprises:
a featured activity input configured to receive an input associating the featured activity with the featured activity controller.

* * * * *